United States Patent
Ali

(10) Patent No.: US 7,215,182 B2
(45) Date of Patent: May 8, 2007

(54) HIGH-PERFORMANCE, LOW-NOISE REFERENCE GENERATORS

(75) Inventor: Ahmed Mohamed Abdelatty Ali, Oak Ridge, NC (US)

(73) Assignee: Analog Devices, Inc., Norwood, MA (US)

( * ) Notice: Subject to any disclaimer, the term of this patent is extended or adjusted under 35 U.S.C. 154(b) by 18 days.

(21) Appl. No.: 11/224,799

(22) Filed: Sep. 12, 2005

(65) Prior Publication Data
US 2007/0057701 A1 Mar. 15, 2007

(51) Int. Cl.
*G05F 3/02* (2006.01)
(52) U.S. Cl. .................................. 327/538; 327/543
(58) Field of Classification Search ............... 327/538, 327/543
See application file for complete search history.

(56) References Cited

U.S. PATENT DOCUMENTS

| | | | |
|---|---|---|---|
| 6,396,334 B1 | 5/2002 | Aram | 327/541 |
| 6,400,214 B1 | 6/2002 | Aram et al. | 327/541 |
| 6,417,725 B1 | 7/2002 | Aram et al. | 327/541 |
| 6,486,820 B1 | 11/2002 | Allworth et al. | 341/161 |
| 6,859,156 B2 * | 2/2005 | May et al. | 341/144 |

FOREIGN PATENT DOCUMENTS

JP 1-180107 * 7/1989 .................. 327/538

OTHER PUBLICATIONS

Razavi, Behzad, "Design of Analog CMOS Integrated Circuits", McGraw Hill, New York, 2001, pp. 393-400.
Maxim Application Note 994, "Reference Voltage for Multiple ADC's", Maxim Integrated Products, Sunnyvale, California, Jan. 24, 2002, pp. 1-6,.
Miller, Perry, "Precision Voltage Regulators", Analog Applications Journal, Nov. 1999, pp. 1-4.
King, Craig, "Differential ADC Biasing Techniques", Microchip Technology, Jun. 2002, pp. 1-5.

* cited by examiner

*Primary Examiner*—Kenneth B. Wells
(74) *Attorney, Agent, or Firm*—Koppel, Patrick, Heybl & Dawson

(57) ABSTRACT

Generators are provided for supplying reference signals that are especially suited to signal conditioning systems such as analog-to-digital converters. They generate reference signals with low output impedances that reduce spurious signals and shorten recovery times. Filters are included to decouple reference structures and thereby reduce noise signals, reduce ringing and dampen resonant circuits that may be formed with the inductance of bond wires and various parasitic chip capacitances. The generators are configured to provide this high performance with a reduced current consumption.

20 Claims, 4 Drawing Sheets

HIGH-PERFORMANCE, LOW-NOISE REFERENCE GENERATORS

BACKGROUND OF THE INVENTION

1. Field of the Invention

The present invention relates generally to reference generators.

2. Description of the Related Art

Reference generators are important contributors to the performance and operation of a variety of signal conditioning systems (e.g., analog-to-digital converters). Insufficiencies in their design will generally degrade critical system performance parameters (e.g., accuracy, noise and speed). Accordingly, there is a need for accurate low-noise reference generators. Preferably, they should also exhibit reduced current drain and be economical to fabricate.

BRIEF SUMMARY OF THE INVENTION

The present invention is directed to high-performance, low-noise reference generators. The novel features of the invention are set forth with particularity in the appended claims. The invention will be best understood from the following description when read in conjunction with the accompanying drawings.

DETAILED DESCRIPTION OF THE INVENTION

Figure 1:
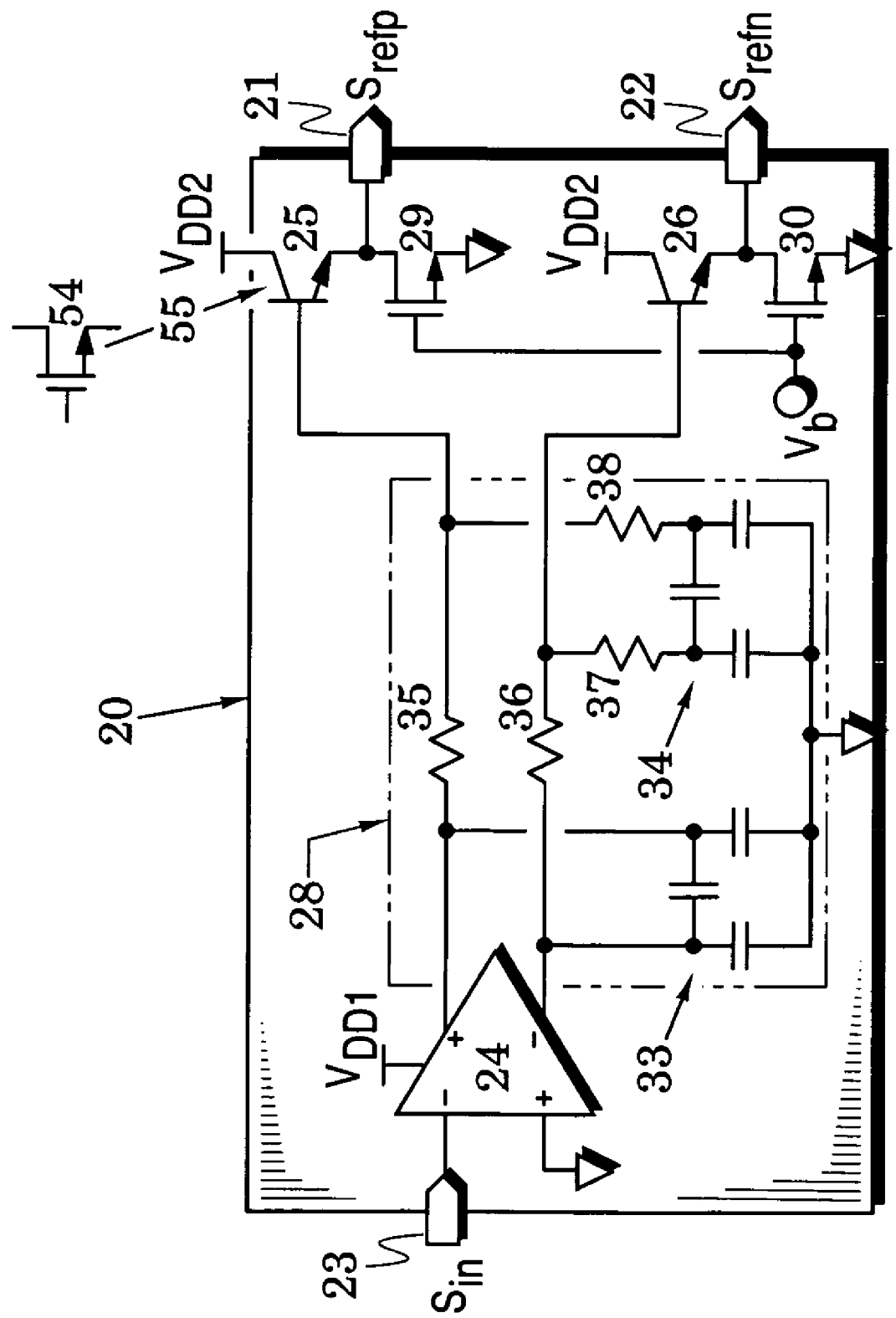
FIGS. 1 and 2 are schematics of reference generator embodiments of the present invention.
Figure 2:
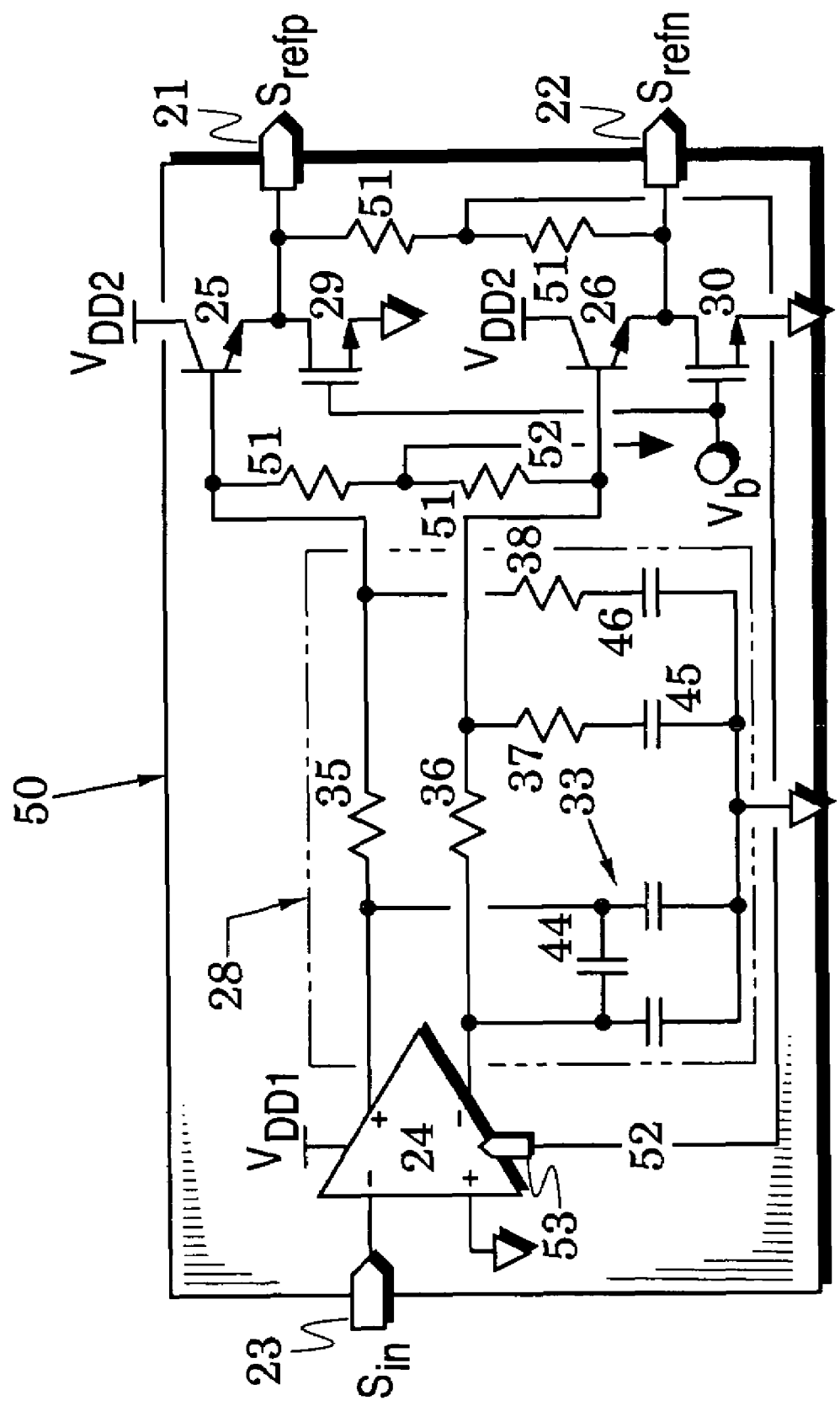

FIGS. 1 and 2 illustrate reference generator embodiments which generate reference signals with low output impedances that thereby reduce spurious signals which would otherwise unduly disturb the levels of the reference signals. The low output impedances also shorten the recovery time which the reference generator 20 requires to restore the levels of these signals. The embodiments include filters that effectively decouple reference structures to thereby reduce noise signals and reduce kick-back signals. In addition, the filters quickly reduce ringing and dampen resonant circuits formed with the inductance of bond wires and various parasitic chip capacitances. The embodiments are further configured to provide this high performance with a reduced current consumption.

In particular, FIG. 1 illustrates a reference generator 20 that provides first and second reference signals $S_{refp}$ and $S_{refn}$ at first and second reference ports 21 and 22 in response to an input reference signal $S_{in}$ at an input port 23. The generator includes a differential amplifier 24, buffers in the form of first and second transistor followers 25 and 26, and a filter 28.

The differential amplifier 24 has first and second output terminals and the first and second transistor followers 25 and 26 have first and second current terminals (e.g., emitters) that are responsive to signals at first and second control terminals (e.g., bases). The filter 28 is coupled between the first and second output terminals and the first and second control terminals. The generator 20 also includes first and second current transistors 29 and 30 that are respectively current-terminal coupled (e.g., drain to emitter) to the first and second transistor followers 25 and 26. The first and second current transistors receive a bias voltage $V_b$ at their control terminals (e.g., bases).

In one embodiment, the filter 28 includes a first pi-section filter 33 that is coupled across the first and second output terminals of the differential amplifier 24. The filter 28 also includes a second pi-section filter 34 that is coupled across the first and second control terminals of the transistor followers 25 and 26.

In another embodiment, the filter 28 includes first and second series resistors 35 and 36 inserted between the first and second output terminals of the differential amplifier 24 and the first and second control terminals of the transistor followers. In another embodiment, the filter 28 includes first and second shunt resistors 37 and 38 inserted to respectively couple the second pi-section filter 34 to the first and second control terminals.

In the embodiment shown in FIG. 1, the first and second pi-section filters 33 and 34 are capacitive pi-section filters. That is, they each comprise first and second shunt capacitors and a third capacitor coupled across the first and second shunt capacitors.

In operation of the reference generator 20, the differential amplifier 24 may be configured as a single-ended to differential amplifier that receives an input reference signal $S_{in}$ from the input port 23 and, in response, provides first and second voltage signals at its first and second output terminals.

The filter 28 is configured to convert the first and second voltage signals to first and second filtered voltage signals and provide the latter signals to the first and second control terminals of the transistor followers 25 and 26. The pi-section filters 33 and 34 effectively decouple the output terminals of the differential amplifier to thereby reduce noise signals and reduce kick-back signals emanating from circuits coupled to receive the first and second reference signals $S_{refp}$ and $S_{refn}$ from the first and second reference ports 21 and 22.

In one embodiment, the entire filter 28 is carried on a semiconductor chip along with the amplifier 24 and the transistor followers 25 and 26. In other generator embodiments, various filter elements (e.g.,) may be moved off-chip. For example, the first pi-section filter 33 may be moved off-chip because its elements (e.g., the capacitor 44 (reference number shown in FIG. 2)) are generally larger than other elements. In embodiments in which at least one filter element is moved off-chip, it is especially desirable that the series resistors 35 and 36 and shunt resistors 37 and 38 be inserted to dampen resonant circuits formed with the inductance of bond wires and various parasitic chip capacitances.

The filter 28 may be simplified in other generator embodiments. FIG. 2, for example, illustrates a generator 50 which includes elements of the generator 20 of FIG. 1 with like elements indicated by like reference numbers. In the generator 50, the pi-section filter 34 is simplified to consist only of the shunt filter capacitors 45 and 46. In all embodiments that drive capacitive components, the amplifier must be appropriately configured to ensure stability. In some generator embodiments, it may be sufficient that the differential amplifier 24 be configured as a relatively slow amplifier.

The generator 50 is also configured to facilitate control of a common-mode level that is generally midway between the first and second reference signals $S_{refp}$ and $S_{refn}$ at the reference ports 21 and 22. In particular, the generator 50 includes feedback elements such as the resistors 51 that are each coupled to the current terminal of a respective one of the first and second transistor followers 25 and 26. The resistors are joined to generate a common-mode feedback signal 52 which is returned to a feedback port 53 of the amplifier 24 to facilitate control of the amplifier's common-mode level. As also shown in FIG. 2, the resistors 51 can be moved from the current terminals of the transistor followers to an alternate location where they are coupled to the control terminals of the transistor followers.

As shown in FIGS. 1 and 2, bias currents through the first and second transistor followers 25 and 26 are provided by the first and second current transistors 29 and 30 in response to the bias voltage $V_b$. The transistor followers 25 and 26 convert the first and second filtered voltage signals at their control terminals to the first and second reference signals $S_{refp}$ and $S_{refn}$ at the first and second reference ports 21 and 22 (these reference signals are indicated with subscripts p and n to indicate their relationships above and below an associated common-mode level). The transistor followers provide low output impedances which are extremely desirable for reducing the passage of transient signals in either direction through the first and second reference ports 21 and 22.

Accordingly, these low output impedances reduce signals that would otherwise unduly disturb the levels of the first and second filtered voltage signals at the first and second control terminals of the transistor followers 25 and 26. They also shorten the recovery time which the reference generator 20 requires to restore the levels of these signals.

When the reference generator 20 is used in a system which requires wide signal swings, signal excursions at the first and second control terminals of the transistor followers 25 and 26 may become excessive. In such an embodiment, the differential amplifier 24 may be operated from a boosted supply voltage $V_{DD1}$. The supply voltage $V_{DD2}$ of the transistor followers 25 and 26 may also have to be boosted. These boosted supply voltages can be generated, for example, by a charge pump. In a different generator embodiment, the supply voltages are simply increased.

Although the transistor followers 25 and 26 of the generator embodiments of FIGS. 1 and 2 are shown as emitter followers, other transistor follower structures may be used in other generator embodiments. For example, the substitution arrow 54 in FIG. 1 shows that source followers 55 may be substituted in other generator embodiments. When emitter followers are used, it may become desirable to inject their base bias currents so as to reduce the current drain imposed on the differential amplifier 24.

Figure 3:
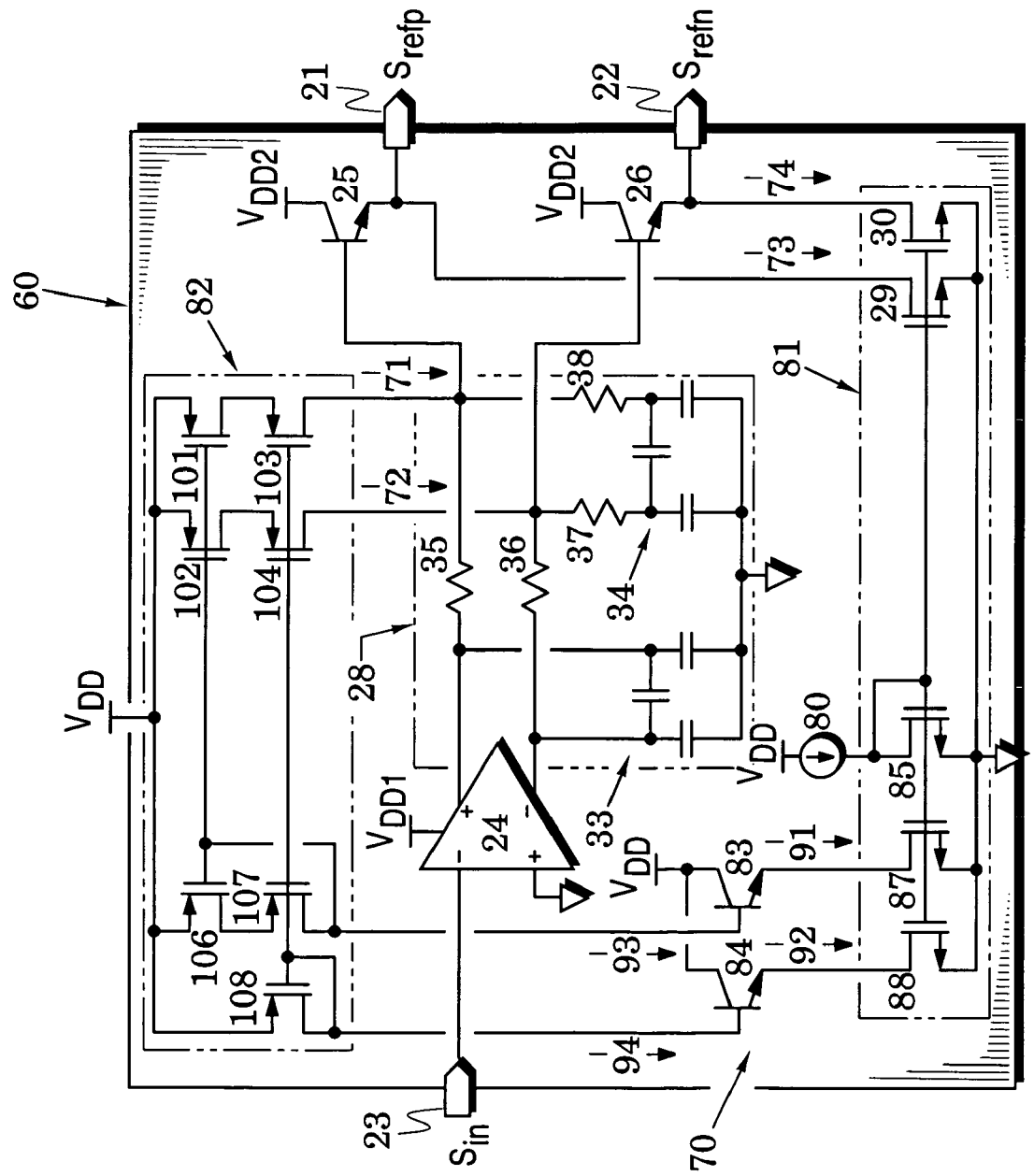
FIGS. 3 and 4 are schematics of other reference generator embodiments.

Accordingly, FIG. 3 illustrates a reference generator 60 that includes a current-mirror system 70 which injects first and second control-terminal bias currents 71 and 72 to the first and second control terminals in addition to providing first and second current-terminal bias currents 73 and 74 to the first and second current terminals of the transistor followers 25 and 26. In addition, the reference generator 60 comprises elements of the reference generator 20 of FIG. 1 with like elements indicated by like reference numbers.

The system 70 includes a current source 80, first and second current mirrors 81 and 82 and first and second transition transistors 83 and 84. The first current mirror 81 includes a diode-coupled transistor 85 that carries the current of the current source 80. It also includes the first and second current transistors 29 and 30 of FIG. 1 which are now respectively control-terminal coupled with the diode-coupled transistor 85 in addition to being respectively current-terminal coupled with the transistor followers 25 and 26. The current transistors 29 and 30 are thus arranged with the diode-coupled transistor 85 to mirror the first and second current-terminal bias currents 73 and 74 to the first and second current terminals of the transistor followers 25 and 26.

The first current mirror 81 also includes additional current transistors 87 and 88 that are respectively control-terminal coupled with the diode-coupled transistor 85 in addition to being respectively current-terminal coupled with the transition transistors 83 and 84. The current transistors 87 and 88 are thus arranged with the diode-coupled transistor 85 to mirror transition currents 91 and 92 to first current terminals of the first and second transition transistors followers 83 and 84.

The transition transistors 83 and 84 are preferably the same transistor type as the transistor followers 25 and 26. In the generator embodiment 60, they are, therefore, bipolar junction transistors which convert first transition currents (i.e., emitter currents) 91 and 92 at their current terminals to substantially-lower second transition currents (i.e., base currents) 93 and 94 at their control terminals.

The second current mirror 82 includes current transistors 101 and 102 which generate the control-terminal bias currents 71 and 72 for the first and second control terminals of the first and second transistors followers 83 and 84. To enhance isolation of the current transistors 101 and 102 from the control terminals, first and second cascode transistors 103 and 104 are preferably inserted into a cascode arrangement with the current transistors. The control terminals of the transistor followers 25 and 26 are thus well shielded from external circuits which may otherwise inject spurious signals into the first and second reference signals $S_{refp}$ and $S_{refn}$ at the first and second reference ports 21 and 22.

The second current mirror 82 also includes a bias transistor 106 that is arranged with a cascode transistor 107 inserted between its current and control terminals. The bias transistor and its cascode transistor are coupled to receive the second transition current 93 from the transition transistor 83. In order to conserve headroom, the control terminal of the cascode transistor 107 is preferably provided with a bias of $2V_{gs}-V_{th}$, wherein $V_{gs}$ is transistor gate-to-source voltage and $V_{th}$ is transistor threshold voltage. Accordingly, the voltage across the current terminals of the bias transistor 106 will be $V_{gs}-V_{th}$ so that it is operated just into saturation to reduce its headroom requirement.

The current transistors 101 and 102 are control-terminal coupled to the bias transistor 106 so that they mirror the control-terminal bias currents 71 and 72 in response to the second transition current 93. Because of this control-terminal coupling, the current transistors 101 and 102 are also operated just into saturation to reduce their headroom requirement. The cascode transistors 103 and 104 are control-terminal coupled to the cascode transistor 107.

The second current mirror 82 further includes a diode-coupled transistor 108 which is control-terminal coupled with the cascode transistor 107 and also coupled to receive the second transition current 94 from the transition transistor 84. If the current transistors 87 and 88 are equally sized, then the second transition currents 93 and 94 are substantially equal.

In a first mirror embodiment, the size of the current transistor 88 can be increased so that the amplitude of the second transition current 94 is increased to a value at which the diode-coupled transistor 108 will provide the desired bias of $2V_{gs}-V_{th}$ to the cascode transistor 107. In a second mirror embodiment, the second transition currents 93 and 94 remain substantially equal and the size of the diode-coupled transistor 108 is sufficiently reduced so that its control terminal provides the desired bias of $2V_{gs}-V_{th}$ to the cascode transistor 107. Because it reduces current, this embodiment is especially attractive.

The first current mirror 81 is thus configured to respond to the current source 80 by mirroring the first and second current-terminal bias currents 73 and 74 to the first and second current terminals of the transistor followers 25 and 26 and mirroring the first transition currents 91 and 92 to the first and second current terminals of the first and second transition transistors followers 83 and 84. Because they are of the same transistor type as the emitter followers 25 and 26, the transition transistors then reduce the first transition currents 91 and 92 to smaller second transition currents 93 and 94. Finally, the second current mirror 82 is configured to conserve headroom as it mirrors these transition currents into the first and second control-terminal bias currents 71 and 72 that are provided to the transistor followers 25 and 26.

It is noted that the first and second reference signals $S_{refp}$ and $S_{refn}$ at first and second reference ports 21 and 22 have different values. Accordingly, the voltages across the current terminals (e.g., $V_{ds}$) of the current transistors 29 and 30 will generally differ and this difference may alter the current-terminal bias currents 73 and 74. This will, in turn, make it desirable to appropriately and differently size the control-terminal bias currents 71 and 72.

Figure 4:
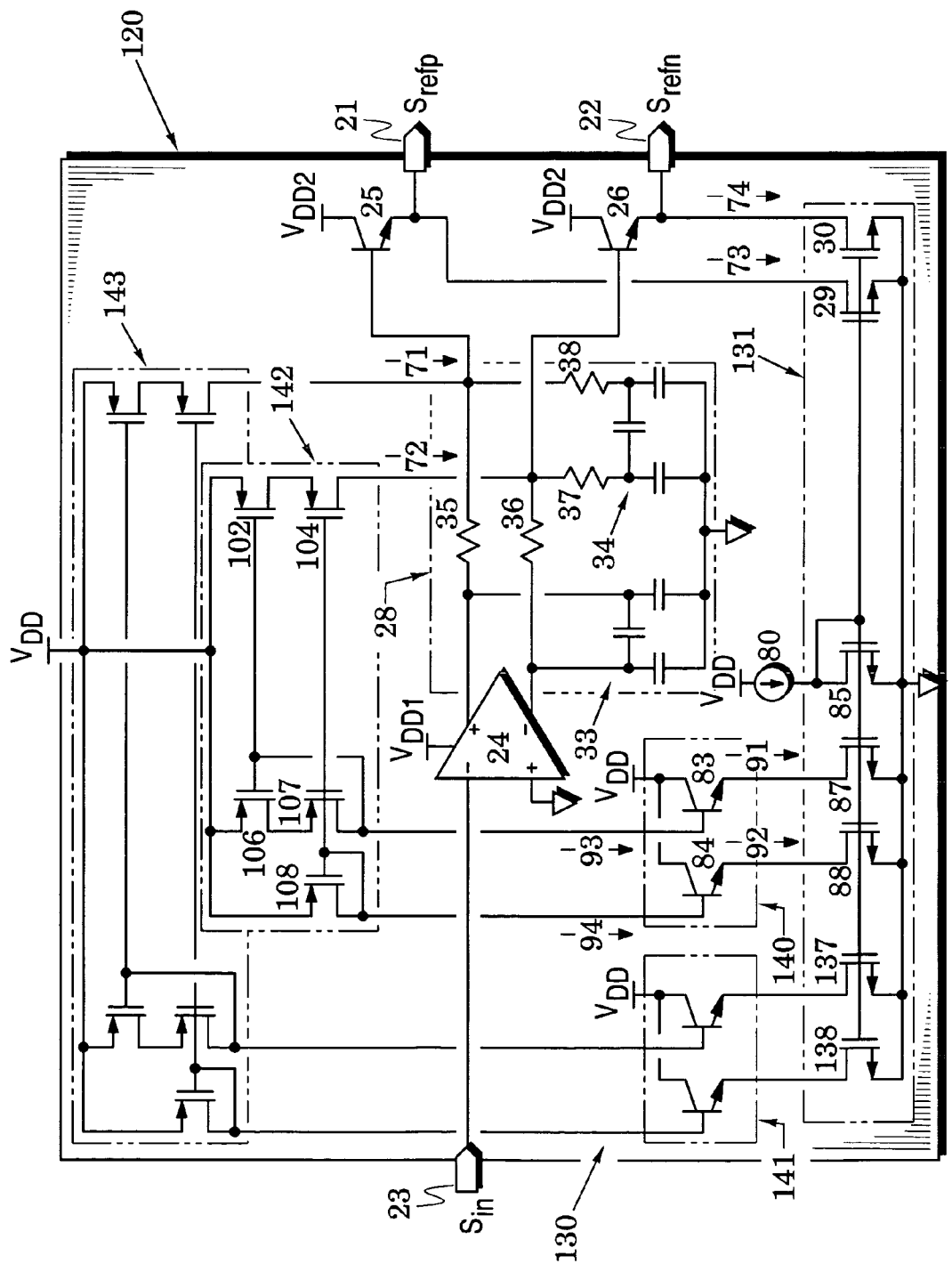

Although generator embodiments can include those in which appropriate transistors (e.g., current transistors 30 and 102) are sized to realize different control-terminal bias current 72, more accurate control is realized with the generator embodiment 120 of FIG. 4 which includes elements of the reference generator 60 of FIG. 3 with like elements indicated by like reference numbers.

In the generator 120, the current mirror system 70 of FIG. 3 is altered to a current mirror system 130 which injects the first and second control-terminal bias currents 71 and 72 to the first and second control terminals in addition to providing the first and second current-terminal bias currents 73 and 74 to the first and second current terminals of the transistor followers 25 and 26.

In particular, the first current mirror 81 of FIG. 3 has been altered to a first current mirror 131 that has added current transistors 137 and 138 which are control-terminal coupled with existing current transistors 87 and 88. Existing transition transistors 83 and 84 are considered to be a transition transistor pair 140 and they are duplicated as an added transition transistor pair 141. The transition transistors of this added pair 141 are current-terminal coupled to the added current transistors 137 and 138.

Finally, the current transistors 101 and 103 are removed from the second current mirror 82 to create a second current mirror 142 which continues to provide the first control-terminal bias current 72. The second current mirror 142 is then duplicated with a second current mirror 143 which is coupled to receive second transition currents from the control terminals of the added transition transistor pair 141 and coupled to provide the first control-terminal bias current 71 to the first transistor follower 25.

The added current transistors 137 and 138, the added pair 141 of transition transistors, and the added second current mirror 143 facilitate the generation and adjustment of the control-terminal bias current 71 and its associated current-terminal bias current 73. This added structure allows the current transistors 87 and 88, the pair 140 of transition transistors, and the second current mirror 142 to be independently directed to the generation and adjustment of the control-terminal bias current 72 and its associated current-terminal bias current 74.

Although the first and second pi-section filters 33 and 34 have been shown in one embodiment as capacitive filters, other generator embodiments may be configured with other filter arrangements.

The input reference signal $S_{in}$ at the input port 23 of FIGS. 1–4 may be provided by various reference circuits (e.g., bandgap references) that are configured to establish a dc voltage which is substantially independent of supply and process variations and has a well-defined behavior with respect to temperature.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A reference generator that provides first and second reference signals, comprising:
   a differential amplifier having first and second output terminals that respectively provide first and second voltage signals spaced about a common-mode level in response to an input reference signal and a common-mode feedback signal;
   a filter configured to provide first and second filtered voltage signals in response to said first and second voltage signals;
   first and second transistor followers having first and second control terminals coupled to respectively receive said first and second filtered voltage signals and having first and second current terminals that provide said first and second reference signals; and
   first and second feedback elements respectively coupled to said first and second transistor followers to generate said common-mode feedback signal.

2. The generator of claim 1, wherein said filter includes:
   a first resistor coupled between said first output terminal and said first control terminal;
   a second resistor coupled between said second output terminal and said second control terminal;
   a first pi-section filter coupled across said first and second output terminals; and
   a second pi-section filter coupled across said first and second control terminals.

3. The generator of claim 1, wherein said first and second feedback elements are first and second resistors.

4. The generator of claim 1, wherein said first and second feedback elements are respectively coupled to said first and second control terminals.

5. The generator of claim 1, wherein said first and second feedback elements are respectively coupled to said first and second current terminals.

6. The generator of claim 1, further including:
   a current source that provides a current signal;
   a first current mirror that mirrors said current signal into bias currents for said first and second current terminals; and
   a second current mirror that mirrors said current signal into bias currents for said first and second control terminals.

7. A reference generator that provides first and second reference signals, comprising:
   a differential amplifier having first and second output terminals that respectively provide first and second voltage signals in response to an input reference signal and a common-mode feedback signal;

a filter coupled across said first and second output terminals;

first and second transistor followers having first and second control terminals coupled to respectively respond to said first and second voltage signals and having first and second current terminals that provide said first and second reference signals;

a current-mirror system that provides bias currents to said first and second transistor followers; and a feedback system that provides said common-mode feedback signal in response to said first and second transistor followers.

8. The generator of claim 7, wherein said current-mirror system includes a current source and is configured to mirror said bias currents to said first and second current terminals and said first and second control terminals in response to said current source.

9. The generator of claim 7, wherein said feedback system includes first and second resistors respectively coupled across said first and second control terminals to thereby provide said common-mode feedback signal.

10. The generator of claim 7, wherein said feedback system includes first and second resistors respectively coupled across said first and second current terminals to thereby provide said common-mode feedback signal.

11. A reference generator that provides first and second reference signals, comprising:

a differential amplifier having first and second output terminals that respectively provide first and second voltage signals in response to an input reference signal;

a pi-section filter coupled across said first and second output terminals; and first and second transistor followers having first and second control terminals coupled to respectively receive said first and second voltage signals and having first and second current terminals that provide said first and second reference signals;

and further including a current-mirror system that provides first and second control-terminal bias currents to said first and second control terminals and first and second current-terminal bias currents to said first and second current terminals.

12. The generator of claim 11, wherein said first and second transistor followers are first and second emitter followers.

13. A reference generator that provides first and second reference signals, comprising:

a differential amplifier having first and second output terminals that respectively provide first and second voltage signals in response to an input reference signal;

a filter configured to provide first and second filtered voltage signals in response to said first and second voltage signals;

first and second transistor followers respectively having first and second control terminals coupled to respectively receive said first and second filtered voltage signals and respectively having first and second current terminals that provide said first and second reference signals; and a current-mirror system that provides first and second control-terminal bias currents to said first and second control terminals and first and second current-terminal bias currents to said first and second current terminals.

14. The generator of claim 13, wherein said filter includes:

resistors inserted between said first and second output terminals and said first and second control terminals; and a pi-section filter coupled across a predetermined one of said first and second output terminals.

15. The generator of claim 13, wherein said filter includes:

a first resistor coupled between said first output terminal and said first control terminal;

a second resistor coupled between said second output terminal and said second control terminal;

a first pi-section filter coupled across said first and second output terminals; and a second pi-section filter coupled across said first and second control terminals.

16. The generator of claim 15, wherein said first and second pi-section filters are first and second capacitive pi-section filters.

17. The generator of claim 15, further including first and second shunt resistors inserted to respectively couple said second pi-section filter to said first and second control terminals.

18. The generator of claim 13, wherein said current-mirror system includes:

a current source that provides a current signal;

at least one transition transistor having a transition control terminal and a transition current terminal;

a first current mirror that mirrors said current signal into said current-terminal bias currents and into a first transition current that is coupled to said transition current terminal; and a second current mirror that mirrors a second transition current from said transition control terminal into said control-terminal bias currents.

19. The generator of claim 18, wherein said first current mirror includes:

a diode-coupled transistor that carries said current signal;

first and second current transistors control-terminal coupled to said diode-coupled transistor and current-terminal coupled to said first and second transistor followers; and a third current transistor control-terminal coupled to said diode-coupled transistor and current-terminal coupled to said transition current terminal.

20. The generator of claim 18, wherein said second current mirror includes:

a diode-coupled transistor control-terminal coupled to said transition transistor; and first and second current transistors control-terminal coupled to said diode-coupled transistor and respectively control-terminal coupled to said first and second transistor followers.

* * * * *